United States Patent

Taccone

[15] 3,659,701
[45] May 2, 1972

[54] COOLING CONVEYOR

[72] Inventor: Russell W. Taccone, 1960 Lakeside Drive, Erie, Pa. 16511

[22] Filed: May 4, 1970

[21] Appl. No.: 34,470

[52] U.S. Cl. .............................................................198/221
[51] Int. Cl. .........................................................B65g 25/08
[58] Field of Search ..................... 198/218, 219, 220 PW, 221

[56] References Cited

UNITED STATES PATENTS

1,763,307  6/1930  Hoffmann ....................... 198/220 DW
2,626,682  1/1953  Just .......................................... 198/219

Primary Examiner—Edward A. Sroka
Attorney—Patrick J. Walsh

[57] ABSTRACT

A cooling conveyor is disclosed for receiving a line of molds from a mold forming machine. The conveyor includes a plurality of conveyor sections having adjacent end portions which interfit so the conveyor sections together define a continuous conveyor surface. One or more individual sections may be moved to make the overall length of the conveyor shorter than the length of a line of molds on the conveyor so that a mold may be dropped from the end of the shortened conveyor. The movable section or sections may be moved to lengthen the conveyor so that a newly formed mold may be added to the line of molds by pushing the line of molds along the conveyor and by moving the movable conveyor section or sections together with molds located thereon.

18 Claims, 9 Drawing Figures

Fig. 1.

INVENTOR.
RUSSELL W. TACCONE

Fig. 9.

INVENTOR.
RUSSELL W. TACCONE 3,659,701

COOLING CONVEYOR

BACKGROUND OF THE INVENTION

The co-pending patent application of Russell W. Taccone, Ser. No. 687,750 filed Dec. 4, 1967 discloses a flaskless molding machine where sand molds are formed on a molding machine and are delivered from the molding machine to a pouring platform where molten metal is poured into the mold for forming a casting.

The flaskless molding machine forms a complete mold during each operating cycle and any two successive molds formed by the machine form a molding cavity at their interface. The molds, therefore, are maintained in face-to-face alignment from the time the last mold is placed on the pouring platform (the input end of the conveyor) until that mold is dropped off the cooling conveyor into a shake-out trough for breaking the castings out of the mold.

Each casting in a mold must be allowed to cool to avoid premature exposure of the solidifying metal to the atmosphere which would cause defects to occur in the casting. Because of this cooling requirement, the molds with castings accumulate in a line over the length of a conveyor. The castings cool within their molds as they progress along the cooling section of the conveyor.

The molding machine in its operation pushes the mold from the molding chamber onto the pouring platform. The push-out operation also serves to push the entire length of sand molds and castings which are located on the pouring platform and on the cooling conveyor. This push-out operation requires the newly formed mold to withstand a substantial loading force not only to push out the mold from its flask but also to move the entire line of sand molds and their castings. Consequently, the push-out operation under conventional conveying techniques creates a substantial hazard of cracking or otherwise injuring the integrity or dimensional accuracy of each newly formed sand mold.

SUMMARY OF THE INVENTION

The present invention provides a conveyor including a pouring platform and a cooling section for use in connection with a molding machine to substantially reduce the force imposed on newly formed molds as they are pushed out from the flask to the pouring platform.

According to the present invention the pouring platform which may comprise a conveying surface defined by a number of parallel rails over which the sand molds may easily slide. Preferably the pouring platform rails are stationary and the molds slide over the conveyor rails. Each mold pushed out from the molding machine slides onto the pouring platform to receive a charge of molten metal. The length of the pouring platform may be selected to avoid an unduly large push-out force on the newly formed molds.

The conveyor cooling section includes a conveying surface comprising spaced rails which interfit and telescope with respect to the fixed rails of the pouring platform. The cooling section is free to move back and forth, (i.e. upstream and downstream at least one mold length in the direction of conveyor movement) and for this purpose the cooling section of the conveyor is mounted on a suitable movable support so that it is free to move with relatively low friction in the direction of mold movement.

One or more movable conveyor cooling sections may be positioned in line to obtain the desired length of the cooling section. Such additional movable sections may be telescoped in interfitting relationship to each of their ends.

As the molding and casting operation continues, the molds are "pushed out" onto the conveyor, one mold at a time. As the molding and casting operation continues the line of the molds grows longer and eventually the molds and castings are pushed onto the cooling section of the conveyor. Since the casting is located between adjacent sand molds, the molds must be kept in face-to-face abutting relation throughout the casting and cooling operations. Consequently, it is necessary to move the entire line of molds as a unit; i.e. without separating adjacent molds, until each casting is sufficiently cooled.

As the push-out operation continues, the fixed section becomes filled with sand molds and castings and eventually at least one mold will be pushed onto the movable section. When push-out occurs, the entire length of molds move as a unit. Those molds located on the pouring platform will slide over the surface of the pouring platform. The molds located on the movable section do not slide but rather the molds together with the movable conveyor section roll on the conveyor mountings in the downstream direction in order to maintain the alignment of molds in face-to-face contact and reduce the force necessary to push out the newly formed mold. To repeat the cycle the movable section slides at least one mold length upstream to be in position to roll downstream with its molds during the next push-out operation.

If desired, power means cooperating with the molds on the moving conveyor sections may assist in pushing the molds during the push-out operation. Such power means may move the conveyor sections per se or may engage the molds themselves for the power movement.

The effective cooling length of the conveyor may be varied. If desired, adjacent movable conveyor sections may be separated to shorten the conveyor length. In this way, molds with cooled castings may drop off the conveyor at the point of separation. A clean off carriage may be used to push the molds off a movable conveyor section which has been separated from the remainder of the conveyor.

OBJECTS OF THE INVENTION

It is an object of the invention to provide a conveyor which reduces the force applied to newly formed molds in a flaskless molding operation without reducing the effective length of the conveyor.

Another object of the invention is to provide a variable length cooling conveyor for varying the time needed for cooling castings.

Other and further objects of the present invention will be understood from the drawings, description of the invention and from the claims appended hereto or will occur to one skilled in the art upon employment of the invention in practice.

DESCRIPTION OF THE DRAWINGS

A preferred embodiment of the invention has been selected for purposes of illustration and description and is shown in the accompanying drawings where.

DETAILED DESCRIPTION

Figure 1:
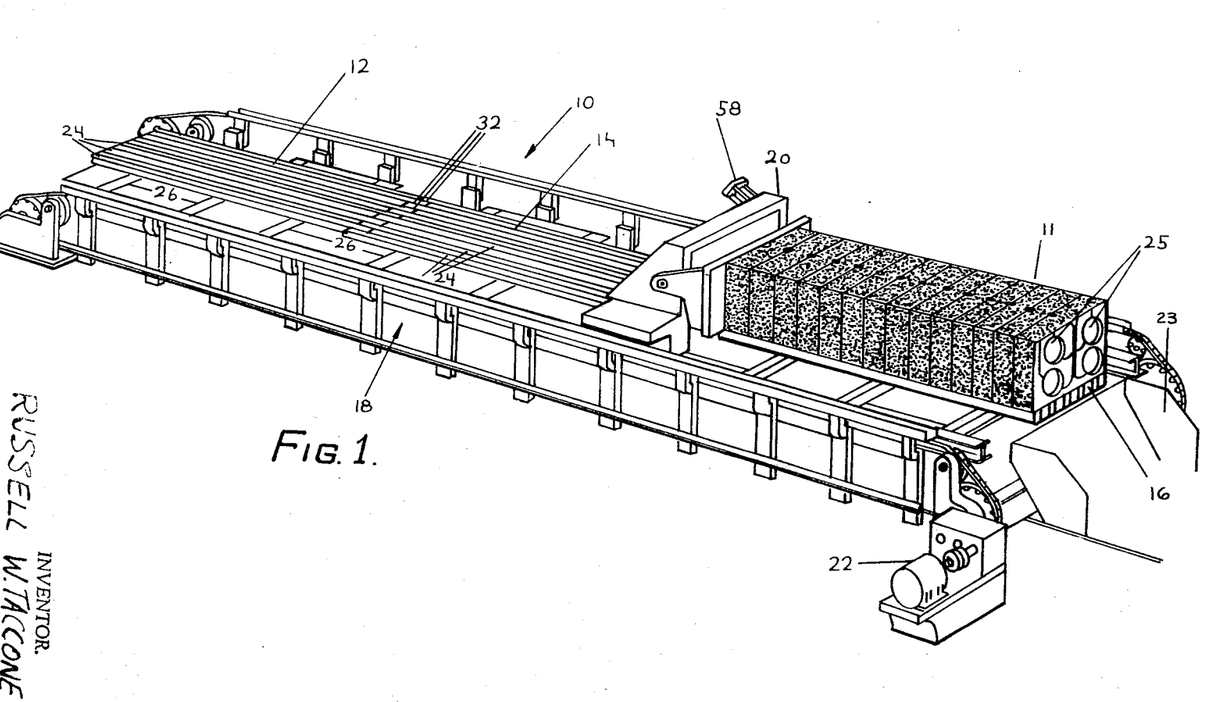
FIG. 1 is a perspective view of the cooling conveyor.

The preferred embodiment of the conveyor 10 for molds 11 is illustrated in FIG. 1 and comprises a pouring platform 12 or a fixed conveyor section and one or more movable conveyor sections 14 mounted on a conveyor frame 18. The conveyor also includes a clean-off carriage 20 and a power unit 22 for moving the carriage and pushing the molds into a shake-out chute 23 where the castings 25 are separated from the sand.

Each conveyor section includes a series of longitudinal rails 24 which define a conveyor surface at their upper surfaces. The conveyor rails 24 are spaced from each other transversely of the conveyor and are mounted on suitable cross beams 25 to allow for telescoping of adjacent conveyor sections with respect to each other. The conveyor rails 24 defining the pouring platform are fixed to the conveyor frame 18 and do not move during operation of the conveyor.

Figure 2:
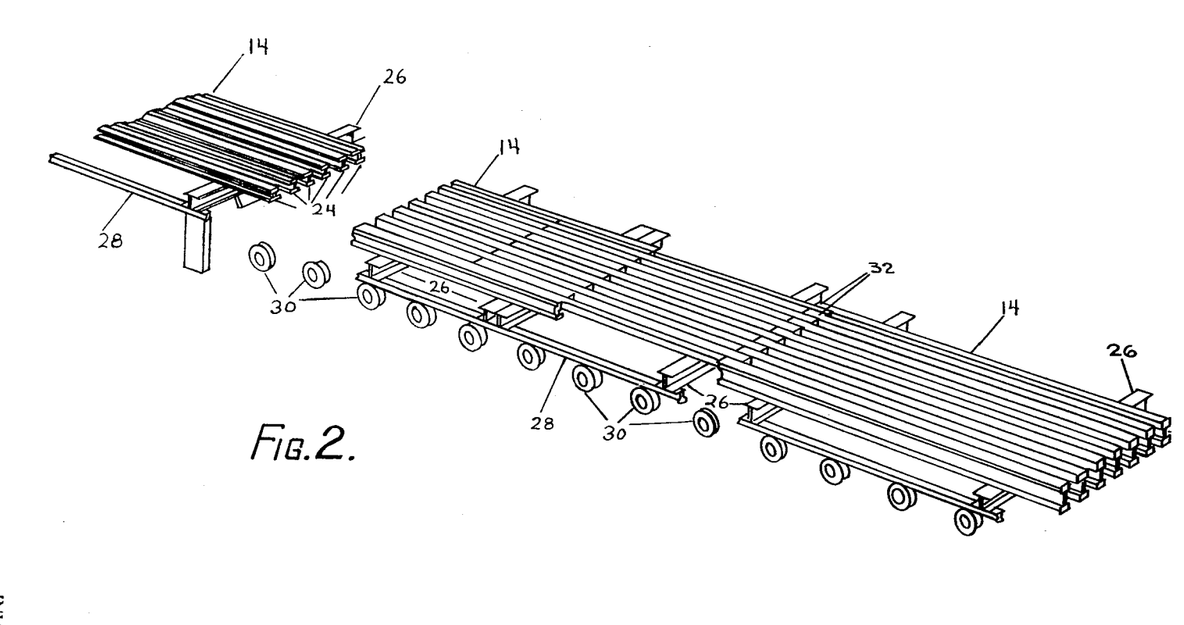
FIG. 2 is a perspective view of the cooling conveyor illustrating details of construction.

As shown in FIG. 2, the cross beams 26 of the movable sections are mounted on tracks 28 which cooperate with a series of rollers 30 to provide for rolling action of the conveyor sections in an upstream and downstream direction along the conveyor. The rollers, of course, are suitably supported on the conveyor frame.

As shown in FIGS. 1 and 2, the end portion 32 of the rails 24 on adjacent conveyor sections are staggered transversely on the conveyor in a manner to allow the ends of adjacent conveyor sections to interfit in telescoping relationship for a distance of at least one mold length.

Suitable power means such as power cylinders 34 are located under each movable conveyor section and cooperate with the cross beams for moving the sections with respect to each other. Preferably the power means includes a double cylinder arrangement to move the conveyor sections a relatively short distance and a relatively long distance. The short movement occurs in operation as the moving sections move molds down the conveyor. The relatively long movement occurs when separating conveyor sections in a manner more fully described below.

Figures 3, 4:
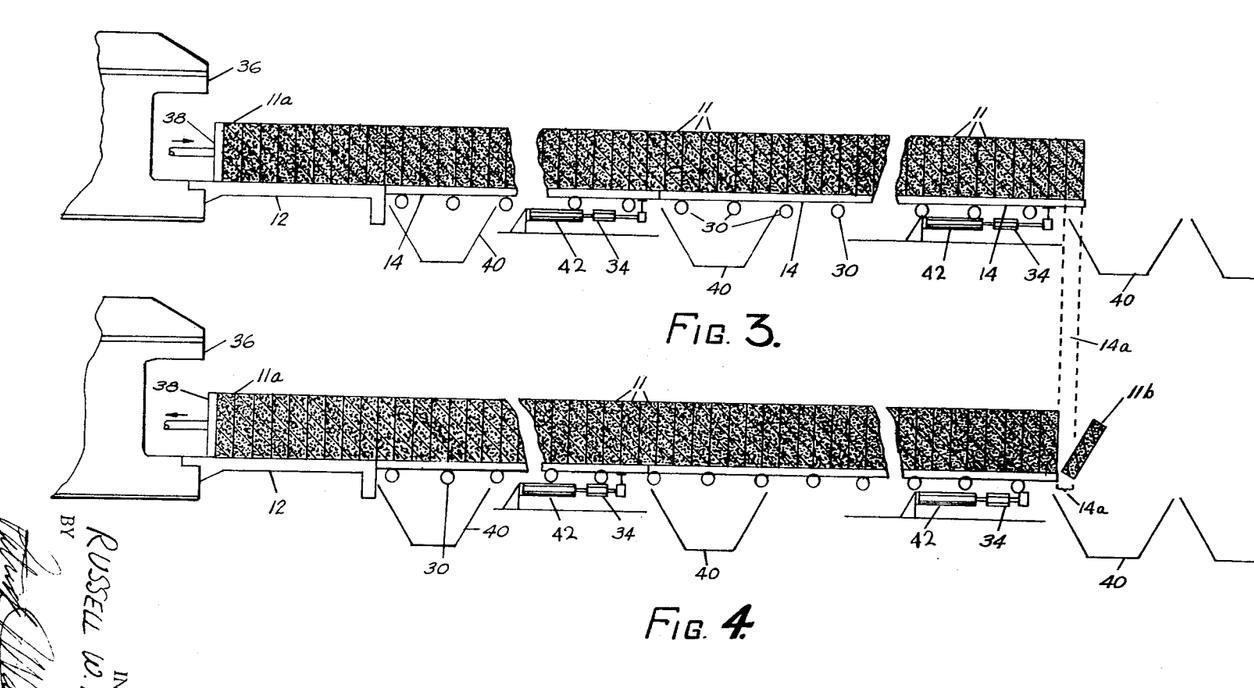
FIG. 3 is a schematic side elevational view of the cooling conveyor in one stage of operation.
FIG. 4 is a schematic side elevational view corresponding to FIG. 3 illustrating the conveyor at different stages of operation.

Referring now to FIGS. 3 and 4, it will be observed that a mold forming machine 36 delivers molds 11 to the pouring platform 12. A reciprocating power cylinder 38 is used to push each mold onto the fixed pouring platform 12. As the mold forming operation and the casting operation progress, the fixed pouring platform becomes filled with sand molds and molds are pushed onto the movable conveyor sections 14.

If the newly formed mold 11 were to sustain the force required to move or to slide additional molds and their castings along the conveyor, there would be substantial danger of injuring the dimensional accuracy or physical integrity of the newly formed mold.

To avoid this happening, the movable conveyor sections 14 are prepared to roll downstream on their rollers 30 during the push-out operation. For this purpose, the first movable section 14 is moved by its power cylinder 34 in the upstream direction so as to slide with respect to the mold or molds 11 located on its surface for a relatively short distance so that the first movable conveyor section is in telescoping relation to the pouring platform. The same sliding action occurs with each successive downstream movable conveyor section 14; i.e., each movable section slides upstream while the molds located on it remain stationary. In this manner the entire movable portion of the conveyor is ready to roll downstream during the push-out operation of the next newly formed mold 11A, thereby substantially reducing the frictional force and consequently the total force necessary to advance the line of molds.

Referring now to FIG. 4, it will be observed that the first mold 11B in line drops off the end of the conveyor into a receiving chute 40 during the time the movable conveyor sections 14 telescope upstream to prepare for the next push-out cycle. The molds 11 are stationary as the conveyor sections telescope upstream and the lead mold 11B falls as the conveyor withdraws as indicated in 14A in FIGS. 3 and 4. The operation continues in this manner with one mold dropping off the end for each mold introduced from the molding machine.

Figures 5, 6:
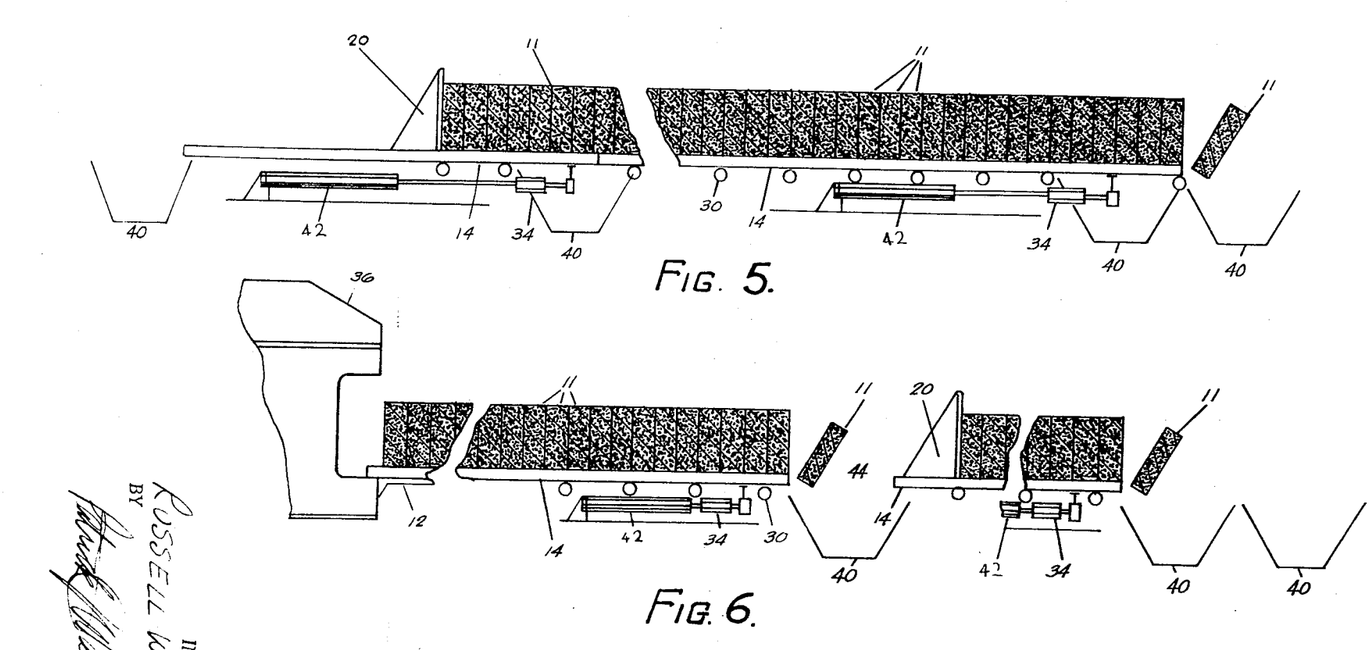
FIG. 5 is a schematic view illustrating the cooling conveyor in combination with a clean-off carriage.
FIG. 6 is a schematic view illustrating the cooling conveyor being divided to shorten the effective length of the conveyor.

It may be desirable to open the conveyor for the purpose of shortening its effective length and for this purpose a power cylinder 42 (FIGS. 5 and 6) having a relatively long stroke is provided for separating the conveyor sections. A suitable shake-out trough 40 is positioned beneath the gap 44 between conveyor sections to receive sand molds and castings pushed off the conveyor. In this event as illustrated in FIGS. 5 and 6, the clean-off carriage 20 may be used to move molds downstream and over the end of the conveyor. This arrangement is used after the requisite number of molds has been formed and the clean-off carriage is arranged to move the final molds off the conveyor. If desired, the clean-off carriage may be powered to move the entire remaining line of molds or the movable sections may be reciprocated as described above to assist the clean-off carriage in moving the molds.

As shown in FIG. 6, the molding machine 36 may continue to form molds or may begin a new molding operation while the clean-off carriage 20 located downstream is processing molds formed and filled on a prior foundry run.

Figure 7:
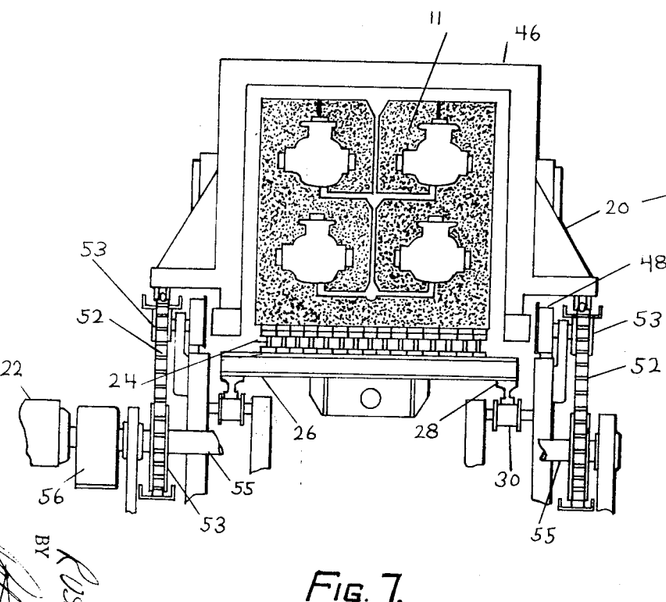
FIG. 7 is a cross section view illustrating the clean-off carriage.
Figure 8:
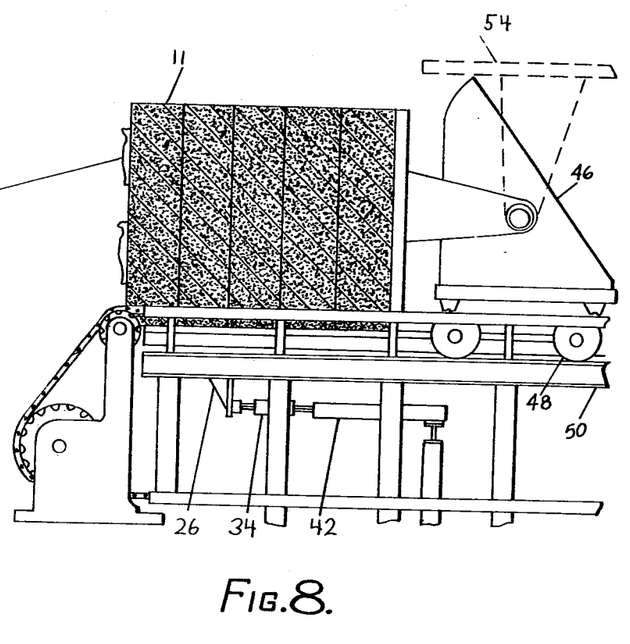
FIG. 8 is a side elevational view illustrating the clean-off carriage.

The supporting and power structure for the clean-off carriage is best illustrated in FIGS. 7 and 8. The clean-off carriage 20 comprises an inverted U-shaped bridge 46 which straddles the conveyor and is mounted on a suitable wheel 48 and rail 50 support structure. A power unit including chain 52, sprockets 53, power shaft 55, speed reducer 56 and motor 22 cooperate with the wheels to drive the clean-off carriage 20 along the conveyor. The clean-off carriage may normally be in an inactive position in which the molds moving along the conveyor simply pass through the inverted bridge structure of the carriage. Thus a push plate 54 pivots above the carriage as shown in broken lines in FIG. 8. A power cylinder 58 (FIG. 1) tilts the push plate between operative and inoperative positions. To operate the clean-off carriage the push plate 54 is pivoted into engagement with the line of molds and the clean-off carriage pushes them off the conveyor.

Figure 9:
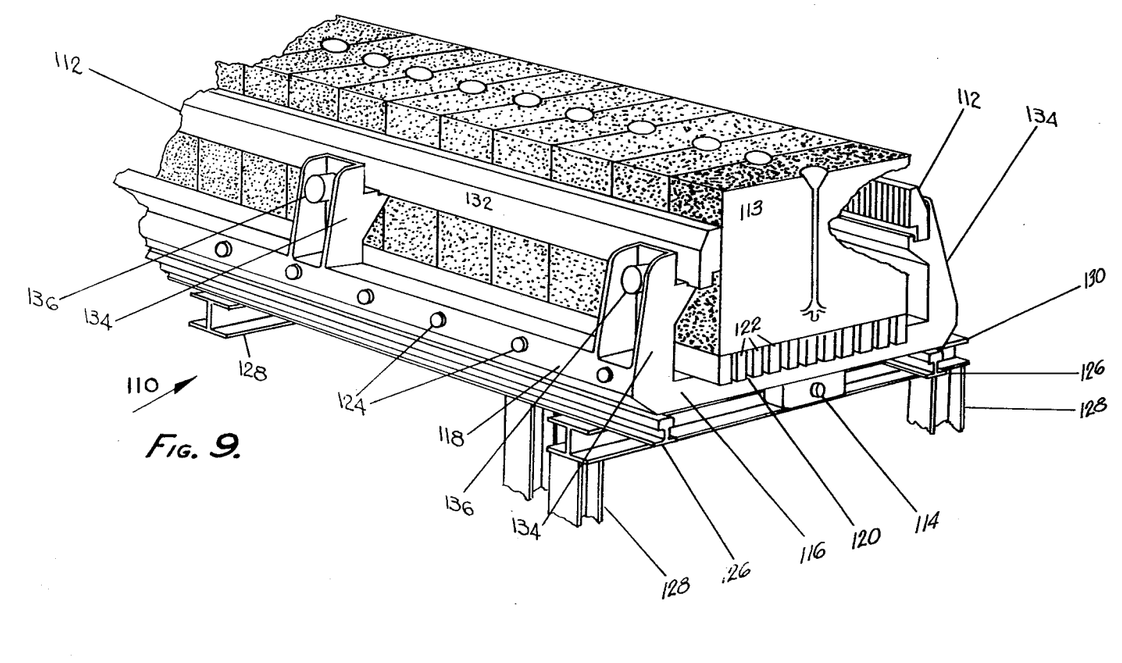
FIG. 9 is a modification of the cooling section to include power assist means to aid in moving molds.

A modified embodiment of the movable section 110 of the cooling conveyor is illustrated in FIG. 9. This movable conveyor provides a means 112 for engaging the sides of the molds 113 so that the movable conveyor, using its power cylinder 114 in the downstream direction, assists the molding machine in moving the molds.

The conveyor 110 includes a carriage 116 having longitudinal 118 and transverse 120 support members. Spaced rails 122 define a conveyor surface mounted on the carriage.

The carriage also includes wheels 124 mounted on a longitudinal trackway 126 which is supported by suitable uprights 128 and cross beams 130.

The power cylinder 114 is connected to the transverse support 120 for moving the carriage along the trackway. The mold engaging means 112 preferably includes a pair of clamping bars 132 are located on either side of the line of molds for engaging and clamping the molds while the power cylinder 114 moves the conveyor. The clamping bars 132 are mounted on uprights 134 which include power cylinders 136 for moving the bars into and out of clamping relation to the molds.

In operation, the moving conveyor 110 clamps and moves the molds 113 downstream during the push-out operation of the molding machine. The conveyor power cylinder 114 may assist in pushing the carriage downstream. After pushout, the power cylinder moves the carriage backwards and the conveyor surface slides with respect to the stationary molds. The conveyor rails 122 telescope with those of the next upstream conveyor in a manner described above. Of course, during this retraction, the side clamps 112 are released.

It will be observed that applicant has provided a unique and novel conveyor for use with molding machinery. The conveyor is of relatively simple design and is economical to construct and operate while providing the versatility of operation not heretofore available in cooling conveyors.

Having thus described my invention, I claim:
1. A conveyor for molds comprising
   at least two movable conveyor sections located in line and adjacent to each other with each conveyor having a plurality of longitudinally arranged, transversely spaced, rails defining a conveyor surface,
   means for supporting the conveyor sections for movement in a longitudinal direction, means for moving said conveyor sections with respect to each from a first arrangement wherein the end portions of each conveyor section have interfitting rails to define a continuous conveyor surface and further to separate the end portions of said sections to create a gap there between to shorten the effective length of the conveyor, and a clean-off carriage mounted on said conveyor for moving molds over either one of said conveyor sections.

2. A conveyor for receiving a line of molds from a molding machine comprising a plurality of conveyor sections having adjacent end portions which interfit so the conveyor sections together define a continuous conveyor surface, means for moving said line of molds on said conveyor, means for moving one of said sections in a direction opposite to the the conveying direction to make the overall length of the conveyor less than the length of a line of molds on the conveyor so that a mold may be dropped from the end of the conveyor, said movable section being further adapted for movement in the conveying direction to lengthen the conveyor surface so that a newly formed mold may be added to the line of molds by pushing the line of molds along the conveyor and by moving the movable conveyor section together with molds located thereon.

3. The conveyor recited in claim 2 wherein said conveyor comprises a fixed section and said fixed section having a tongue and groove end and said movable section having a tongue and groove interfitting with the said tongue and groove end on said movable conveyor section, said tongue and groove ends being adapted to slide relative to each other whereby a continuous conveyor surface is provided over said fixed section and said movable conveyor surface.

4. A conveyor for receiving a line of molds from a molding machine comprising a fixed conveyor section, a movable conveyor section, said fixed section and said movable section having adjacent end portions which interfit so both sections together define a continuous conveying surface, means for moving said movable section in a direction opposite to the conveying direction to shorten the overall conveyor surface so that a mold may be dropped from the end of the conveyor, said movable section being further adapted for movement in the conveying direction to lengthen the conveyor surface so that a newly formed mold may be added to the line of molds, and means for pushing the line molds to slide along the fixed conveyor section and to move the movable conveyor section together with molds located thereon to accommodate the newly formed mold.

5. A conveyor as defined in claim 4 in which said movable conveyor section includes means for clamping the opposite sides of the portion of the molds thereon as the movable section is moved to lengthen the conveyor.

6. A conveyor for receiving a line of molds from a molding machine comprising a fixed conveyor section, a plurality of movable conveyor sections, said fixed section and said movable sections having adjacent end portions which interfit to define a continuous conveying surface, means for moving each movable section in a direction opposite to the conveying direction to shorten the overall conveyor surface so that a mold may be dropped from the end of the conveyor, said movable sections being further adapted for movement in the conveying direction to lengthen the conveyor surface so that a newly formed mold may be added to the line of molds by pushing the line molds to slide along the fixed conveyor section and to move the movable conveyor sections together with molds located thereon to accommodate the newly formed mold, and means for separating said conveyor between adjacent movable sections so that molds may be removed from the conveyor at said separations.

7. The conveyor of claim 6 which further includes in combination means for receiving molds removed from the conveyor at said separations.

8. A conveyor for a line of molds comprising a plurality of adjacent conveyor sections defining a continuous conveyor surface having a first longitudinal dimension, said conveyor sections having adjacent end portions adapted to telescope with respect to each other, at least one of said conveyor sections being mounted for translatory movement with respect to a next adjacent conveyor section, said continuous conveyor surface adapted to receive a line of molds along its surface, means for moving said one conveyor section into telescoping relation with respect to an adjacent conveyor section so that the effective length of said conveyor is shorter than said first longitudinal dimension so that a mold positioned at the end of said conveyor falls off, and means for moving said line of molds.

9. A conveyor for receiving a line of molds being made and delivered from a mold forming machine comprising a plurality of adjacent conveyor sections defining a continuous conveyor surface, said conveyor sections having end portions adapted to telescope with respect to each other, at least one of said conveyor sections being mounted for translatory movement toward and away from its adjacent conveyor section so that the ends of said adjacent conveyor sections are telescoped with respect to each other, means for moving one conveyor section toward and into telescoping relation with respect to an adjacent conveyor section so that the effective length of said conveyor is shortened and so that a mold located at the end of one section may be transferred to its next adjacent conveyor section along said continuous conveyor surface, and means for pushing a mold on said continuous conveyor surface at one end of the line of molds to move the line of molds along said continuous conveyor surface and to move said one conveyor section in a direction away from its adjacent conveyor section along with any portion of said line of molds located thereon.

10. A conveyor as defined in claim 9 which further includes a clean-off carriage for moving molds along said conveyor surface.

11. A conveyor as defined in claim 9 in which said plurality of conveyor sections includes a fixed section at one end for positioning adjacent said mold forming machine for receiving molds therefrom, and a plurality of movable conveyor sections.

12. A conveyor as defined in claim 11 which further includes roller means for mounting said movable conveyor sections for low friction movement, and means for separating said movable conveyor sections so that molds may be removed from the conveyor at said separation.

13. A conveyor as defined in claim 12 which further includes means for moving molds along said movable conveyor section remote from said molding machine.

14. A conveyor for receiving a line of molds from a molding machine with adjacent molds abutting at their interfaces to define mold cavities for forming castings comprising a fixed conveyor section and a plurality of movable conveyor sections lying in end to end relation and defining a continuous conveyor surface for receiving a line of molds from said molding machine, said fixed conveyor section being located at one end of the conveyor for receiving molds from said molding machine, said fixed conveyor section, and each of said movable conveyor sections having a plurality of longitudinally extending, laterally spaced rails having upper surfaces defining the conveyor surface, the rails of adjacent conveyor sections being offset from each other in a lateral direction so that the end portions of the rails on adjacent conveyor sections may interfit in telescoping relation, a plurality of roller means for mounting each movable section in the direction in which the conveyor extends, means for moving the movable conveyor sections to shorten the conveyor length so that a mold on the end of the conveyor will fall off, and means for pushing a newly formed mold onto the fixed conveyor section, for sliding molds over the fixed conveyor section, and for moving the movable conveyor sections together with the molds thereon so that said means for pushing moves the entire line of molds along said conveyor without separating the molds from each other.

15. A conveyor for a line of molds comprising a plurality of adjacent conveyor sections defining a continuous conveyor surface having a first longitudinal dimension, said conveyor sections having adjacent end portions adapted to telescope with respect to each other, at least one of said conveyor sections being mounted for movement with respect to a next adjacent conveyor section, said continuous conveyor surface adapted to receive a line of molds along its surface, means for separating said conveyor into separate sections, and means cooperating with said movable conveyor section for moving said molds along and over the end of said movable conveyor section.

16. The conveyor as defined in claim 15 in which said mold moving means comprises a bridge member straddling said conveyor, means pivotally mounted on said bridge member for engaging and pushing molds along the conveyor surface, means for tilting said pushing means between active and inactive positions, and means for moving the bridge member along said conveyor.

17. A conveyor for molds comprising a fixed conveyor section having longitudinally arranged rails transversely spaced from each other to define a conveyor surface, a plurality of movable conveyor sections in line with said fixed section, each movable conveyor having longitudinally arranged rails transversely spaced from each other to define a conveyor surface, the plurality of movable conveyor sections positioned in line and having the end portions of their rails interfitting in telescoping relation to define a continuous conveyor surface, one movable conveyor section being adjacent to and having its upstream end interfitting with the rails of the fixed section, support means including wheels and longitudinal tracks for supporting said movable conveyor sections for movement, first drive means cooperating with said conveyor for moving said molds in a first direction, second drive means being adapted to move said conveyor sections in a second direction, means for restraining said molds whereby said molds are not moved in said second direction, and third drive means connected to each of said movable sections to move said sections away from its immediately adjacent conveyor section to provide a gap between conveyor sections for removing molds from the conveyor at said gap.

18. In an apparatus for forming a plurality of molds and for arranging and moving the molds in a line with adjacent molds abutting at their interfaces to define mold cavities for forming castings the improvement which comprises a plurality of conveyor sections having adjacent end portions which interfit so the conveyor sections together define a continuous conveyor surface, means for moving one of said sections in the conveying direction to make the overall length of the conveyor less than the length of a line of molds on the conveyor so that a mold may be dropped from the end of the conveyor, said movable section being further adapted for movement in the conveying direction to lengthen the conveyor surface so that a newly formed mold may be added to the line of molds by pushing the line of molds along the conveyor and by moving the movable conveyor section together with molds located thereon.

* * * * *